United States Patent
Laukemann et al.

(10) Patent No.: US 8,297,051 B2
(45) Date of Patent: Oct. 30, 2012

(54) HYDRODYNAMIC MACHINE AND METHOD FOR MINIMIZING THE DRAG POWER OF SUCH A MACHINE

(75) Inventors: Dieter Laukemann, Crailsheim (DE); Thomas Ohr, Crailsheim (DE); Achim Neher, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/207,040

(22) Filed: Aug. 10, 2011

(65) Prior Publication Data

US 2012/0012185 A1    Jan. 19, 2012

Related U.S. Application Data

(63) Continuation of application No. PCT/EP2010/007967, filed on Dec. 29, 2010.

(30) Foreign Application Priority Data

Jan. 15, 2010  (DE) .......................... 10 2010 004 835

(51) Int. Cl.
  *F16D 33/10*  (2006.01)
  *F16D 57/04*  (2006.01)
(52) U.S. Cl. ........................................... 60/357; 60/330
(58) Field of Classification Search .................... 60/330, 60/337, 357, 359
  See application file for complete search history.

(56) References Cited

U.S. PATENT DOCUMENTS 2,170,128 A    8/1939    Mater
(Continued)

FOREIGN PATENT DOCUMENTS

DE    1146719    4/1963
(Continued)

OTHER PUBLICATIONS

International Search Report for PCT/EP2010/007967, dated Mar. 11, 2011. (4 pages).

(Continued)

*Primary Examiner* — Thomas E Lazo
(74) *Attorney, Agent, or Firm* — Taylor IP, P.C.

(57) ABSTRACT

The invention relates to a hydrodynamic machine, in particular a retarder, having an external working medium circuit, comprising: a bladed primary wheel and a bladed secondary wheel which together form a toroidal working chamber which can be filled with working medium from the external working medium circuit, which is fed back into the external working medium circuit; an annular channel disposed outside the working chamber, which is connected in a working-medium conducting manner to the working chamber via outlet holes in the primary wheel or secondary wheel, and is in flow-conducting communication with the external working medium circuit in order to collect working medium leaving the working chamber through the outlet holes and supply this to the external working medium circuit. The invention is characterized by the following features: having at least one tapping opening disposed on or outside the working chamber which is in flow-conducting communication with the working chamber of the hydrodynamic machine and at least one filling channel which opens into a region of relatively low working medium pressure inside the hydrodynamic machine and which is in flow-conducting communication with the working chamber; wherein the at least one tapping opening and the filling channel are interconnected in a working-medium conducting manner by means of a return line outside the external working medium circuit in such a manner that working medium flows from the at least one tapping opening into the filling channel and from there back into the working chamber.

10 Claims, 2 Drawing Sheets

U.S. PATENT DOCUMENTS

| | | | |
|---|---|---|---|
| 3,051,273 A | | 8/1962 | Cordiano et al. |
| 3,774,735 A | * | 11/1973 | Hanke et al. .................... 60/337 |
| 3,888,335 A | * | 6/1975 | Hanke ............................ 60/337 |
| 3,934,687 A | * | 1/1976 | Becker ............................ 60/359 |
| 3,955,368 A | * | 5/1976 | Becker ............................ 60/359 |
| 3,999,385 A | * | 12/1976 | Hoeller et al. .................. 60/330 |
| 4,773,513 A | * | 9/1988 | Herrmann et al. ............ 188/296 |
| 5,251,441 A | * | 10/1993 | Eon et al. ........................ 60/330 |
| 5,651,432 A | * | 7/1997 | Vogelsang .................... 188/296 |
| 5,852,931 A | * | 12/1998 | Reichenmiller et al. ........ 60/330 |
| 6,923,301 B2 | * | 8/2005 | Jonsson et al. ................ 188/296 |
| 7,584,608 B2 | | 9/2009 | Pittius et al. |
| 2004/0112047 A1 | * | 6/2004 | Vogelsang et al. .............. 60/330 |
| 2004/0238301 A1 | * | 12/2004 | Kamossa et al. .............. 188/290 |
| 2007/0007093 A1 | * | 1/2007 | Vogelsang .................... 188/296 |
| 2007/0132308 A1 | * | 6/2007 | Vogelsang et al. ................ 303/3 |

FOREIGN PATENT DOCUMENTS

| | | |
|---|---|---|
| DE | 1630762 | 5/1970 |
| DE | 10163486 C1 | 10/2003 |
| DE | 10 2007 030 282 A1 | 1/2008 |
| DE | 10 2007 029 018 A1 | 1/2009 |
| EP | 0204397 A1 | 12/1986 |

OTHER PUBLICATIONS

Written Opinion of the International Searching Authority (undated) for PCT/EP2010/007967. (6 pages).

* cited by examiner

HYDRODYNAMIC MACHINE AND METHOD FOR MINIMIZING THE DRAG POWER OF SUCH A MACHINE

CROSS REFERENCE TO RELATED APPLICATIONS

This is a continuation of PCT application No. PCT/EP2010/007967, entitled "HYDRODYNAMIC MACHINE AND METHOD FOR MINIMIZING THE TUGGING POWER THEREOF", filed Dec. 29, 2010, which is incorporated herein by reference.

BACKGROUND OF THE INVENTION

1. Field of the Invention

The present invention relates to a hydrodynamic machine, in particular a hydrodynamic retarder, which is incorporated in an external working medium circuit and a method for minimising the drag power of such a hydrodynamic machine.

2. Description of the Related Art

Hydrodynamic machines having an external working medium circuit differ from hydrodynamic machines without an external circuit in that the working medium does not remain permanently inside the hydrodynamic machine, for example, either in the working chamber or a store chamber provided in the hydrodynamic machine—also called retarder chamber—but is passed from an external working medium circuit in which a cooler is usually provided for the working medium, into the hydrodynamic machine or the working chamber thereof and is then removed from the working chamber or the hydrodynamic machine into the external working medium circuit. Accordingly the hydrodynamic machine has at least one working medium inlet and one working medium outlet. A pressure regulating valve, for example, is provided in the working medium outlet or behind this in the direction of flow, by which means the static pressure in the working chamber and therefore the filling level of the working chamber is adjusted.

The removal of working medium from the working chamber and when switching off the hydrodynamic machine, the emptying of the working chamber is accomplished by means of so-called outlet holes. These outlet holes are provided distributed over the circumference of the hydrodynamic machine (when viewed in the direction of rotation) in the blades or in the intermediate spaces between the blades, in the case of a retarder, usually the stator, and open on the one hand in the working chamber and on the other hand in an annular channel extending in the circumferential direction (direction of rotation) of the hydrodynamic machine. The annular channel is used for collecting the working medium, that is the flow of working medium from the individual outlet holes is combined in the annular channel. From the annular channel the working medium is then passed via the said working medium outlet, which is disposed in relation to the direction of flow in series with the outlet holes, into the external working medium circuit.

A disadvantage of the known designs is that the hydrodynamic machine, particularly when this is designed as a retarder, and the outlet holes in the stator which are provided in a not-revolving blade wheel, do not empty completely since particularly in a partially filled state of the working chamber, that is, when the maximum possible amount of working medium is no longer present in the working chamber, the pressure losses in the working medium flow through the outlet holes prevent this. In such a partially filled state of the working chamber, the pressure in the working chamber driving the emptying is lower than that in the fully filled state.

DE 10 2007 029 018 describes such a hydrodynamic machine having a primary wheel and a secondary wheel forming a working chamber which can be filled via an external working medium circuit in order to accordingly adjust the power transmission of the hydrodynamic machine. Further provided is an annular channel which is connected in a working-medium conducting manner with the working chamber via outlet holes in the primary wheel and the secondary wheel. As a result of emptying problems, in addition to the outlet holes, a working medium outlet is provided which opens in the working chamber and is disposed parallel to the annular channel. The features of this document are summarized as follows: A hydrodynamic machine, in particular a retarder, having an external working medium circuit, comprising: a bladed primary wheel and a bladed secondary wheel which together form a toroidal working chamber which can be filled with working medium from the external working medium circuit, which is fed back into the external working medium circuit; an annular channel disposed outside the working chamber, which is connected in a working-medium conducting manner to the working chamber via outlet holes in the primary wheel or secondary wheel, and is in flow-conducting communication with the external working medium circuit in order to collect working medium leaving the working chamber through the outlet holes and supply this to the external working medium circuit.

Experiments have now shown that hydrodynamic machines as described by the above document reduce the drag power (transmitted power as a result of a residual quantity of working medium in the working chamber when the hydrodynamic machine is deactivated). Accordingly, the drag power is not optimal at each rotational speed so that at certain rotational speeds the hydrodynamic machine transmits undesired power which can lead to an undesired power loss in the drive train in which the hydrodynamic machine is used.

It is the object of the present invention to provide, and what is needed in the art is, a hydrodynamic machine in which the extensive emptying of the working chamber is improved compared with the prior art and a method for minimizing the drag power at all rotational speeds.

SUMMARY OF THE INVENTION

The object according to the invention is achieved by, and the present invention provides, a hydrodynamic machine, in particular a retarder, having an external working medium circuit, comprising: a bladed primary wheel and a bladed secondary wheel which together form a toroidal working chamber which can be filled with working medium from the external working medium circuit, which is fed back into the external working medium circuit; an annular channel disposed outside the working chamber, which is connected in a working-medium conducting manner to the working chamber via outlet holes in the primary wheel or secondary wheel, and is in flow-conducting communication with the external working medium circuit in order to collect working medium leaving the working chamber through the outlet holes and supply this to the external working medium circuit; characterised by the following features: having at least one tapping opening disposed on or outside the working chamber which is in flow-conducting communication with the working chamber of the hydrodynamic machine and at least one filling channel which opens into a region of relatively low working medium pressure inside the hydrodynamic machine and which is in flow-conducting communication with the working chamber; wherein the at least one tapping opening and the filling channel are interconnected in a working-medium conducting manner by means of a return line outside the external working medium circuit in such a manner that working medium flows from the at least one tapping opening into the filling channel and from there back into the working chamber, so that a working medium circuit is established outside the external working medium circuit. Further, the object according to the invention is achieved by, and the present invention provides, a method for minimizing the drag power of a hydrodynamic machine, in particular a retarder, having an external working medium circuit, comprising: a bladed primary wheel and a bladed secondary wheel which together form a toroidal working chamber which can be filled with working medium from the external working medium circuit, which is fed back into the external working medium circuit; an annular channel disposed outside the working chamber, which is connected in a working-medium conducting manner to the working chamber via outlet holes in the primary wheel or secondary wheel, and is in flow-conducting communication with the external working medium circuit in order to collect working medium leaving the working chamber through the outlet holes and supply this to the external working medium circuit; characterised by the following features: having at least one tapping opening disposed on or outside the working chamber which is in flow-conducting communication with the working chamber of the hydrodynamic machine and at least one filling channel which opens into a region of relatively low working medium pressure inside the hydrodynamic machine and which is in flow-conducting communication with the working chamber; wherein the at least one tapping opening and the filling channel are interconnected in a working-medium conducting manner by means of a return line outside the external working medium circuit in such a manner that working medium flows from the at least one tapping opening into the filling channel and from there back into the working chamber, so that a working medium circuit is established outside the external working medium circuit; when viewed in the direction of flow of the working medium, a first valve or a diaphragm and a collecting container as well as a second valve are disposed successively in the return line. The method is characterised by the following steps: filling the collecting container with working medium from the working chamber via the additional working medium outlet by closing the second valve or keeping closed the second valve and, if provided, by opening the first valve or keeping open the first valve when deactivating the hydrodynamic machine; emptying the collecting chamber via the filling channel by opening the second valve and, if present, by closing the first valve when activating the hydrodynamic machine or when the hydrodynamic machine is activated.

In detail, the hydrodynamic machine according to the invention, which is designed in particular as a retarder, i.e. comprising a revolving blade wheel and a stationary blade wheel, and which is incorporated in an external working medium circuit, for example engine cooling circuit of a motor vehicle, comprises a bladed primary wheel and a bladed secondary wheel which together form a toroidal working chamber which can be filled with working medium from the external working medium circuit, the working medium being fed from the working chamber of the hydrodynamic machine back into the external circuit.

In the hydrodynamic machine, an annular channel is provided outside the working chamber, which is advantageously provided on the same diameter as the working chamber in particular when viewed in the axial direction, directly behind the working chamber and which is connected in a working-medium conducting manner to the working chamber via outlet holes in one of the two blade wheels, in the case of a retarder in particular, in the stator, in order to collect working medium leaving the working chamber through the outlet holes and then supply this through a working medium outlet to the external circuit. The plurality of outlet holes are disposed with regard to the working medium flow and in particular geometrically parallel to one another and for example, when viewed in the circumferential direction, are disposed on a plurality of or all the blade intermediate spaces in a bladed wheel, in particular in the stator of a retarder.

Advantageously with respect to the working medium flow, at least one additional working medium outlet is provided parallel to the outlet holes, in particular a single additional working medium outlet which also opens in the working chamber, usually directly, and which at the same time opens directly or indirectly in the external working medium circuit. Since this additional working medium outlet so to speak bypasses the annular channel or is disposed parallel to this, in this outlet the pressure loss in the flow which during flow of the working medium through the outlet holes and in particular during inflow of the working medium from the outlet holes into the annular channel which has a substantially larger cross-section than the individual outlet holes, can be avoided so that very much easier emptying of the working chamber and therefore a more extensive emptying can be achieved regardless of a low working medium pressure in the working chamber.

According to the invention, in particular, in addition to the at least one working medium outlet, there is provided at least one tapping opening disposed on or outside, advantageously radially outside, the working chamber which is in flow-conducting communication with the working chamber of the hydrodynamic machine and at least one filling channel which opens into a region of relatively low working medium pressure inside the hydrodynamic machine and which is in flow-conducting communication with the working chamber. In this case, the at least one tapping opening and the filling channel are interconnected in a working-medium conducting manner by means of a return line outside the external working medium circuit in such a manner that working medium flows from the at least one tapping opening into the filling channel and from there back into the working chamber indirectly or directly. The return line is provided in addition to the usual external working medium circuit and is therefore not shown by the connection between the annular channel and the working medium inlet through the external working medium circuit. On the contrary, the return line is usually significantly shorter than this connection.

Working medium located in the working chamber or on the rear side of the blade wheel, is advantageously ejected radially outwards via the rotating bladed primary wheel (in the case of a hydrodynamic coupling also secondary wheel), and impinges upon the at least one tapping opening which is advantageously located directly opposite the rotating blade wheel. As a result of the centrifugal acceleration, the working medium passes through the tapping opening with a relatively high dynamic pressure and flows via the return line into the filling channel. Since the filling channel opens in a location of relatively low working medium pressure in the hydrodynamic machine, for example, in the region of the hydrodynamic centre of the working medium circuit flow in the working chamber, in an inflow channel in the hydrodynamic machine or in the working medium inlet, a circulating flow is obtained from the working chamber via the return line to the filing channel and from there back to the working chamber. By means of this circulating flow, a part of the working medium is therefore branched from the working chamber of the hydrodynamic machine (circuit volume) and initially returned to this via the filling chamber bypassing the working chamber. As a result, the instantaneous working medium volume in the hydrodynamic machine decreases, particularly if no additional working medium is supplied via the external working medium circuit (deactivated hydrodynamic machine). As a result of this branching of the partial flow, comparatively less working medium therefore enters into the working chamber so that the drag power in the deactivated hydrodynamic machine is further reduced. This circulating flow can be established equally when the hydrodynamic machine is deactivated (non-braking operation in a retarder) and when it is activated (braking operation) but is preferred in the deactivated state. Thus, the circulating flow can advantageously be interrupted in the activated state, for example, by means of a valve.

When viewed in the direction of flow, a first valve or a diaphragm and a collecting container as well as a second valve are advantageously disposed successively in the return line.

The first and/or second valve are advantageously designed as directional valves, in particular as 2/2 way valves.

By means of the two valves or the one valve and the diaphragm, the minimisation of the drag power when the hydrodynamic machine is deactivated can be further improved without adversely affecting the efficiency or the power transmission in the activated state. In particular, the filling and emptying of the collecting container can be optimally controlled by the switching position of the valves.

A method for minimizing the drag power of a hydrodynamic machine designed according to the invention comprises the following steps:
  filling the collecting container with working medium from the working chamber via the additional working medium outlet by closing the second valve or keeping closed the second valve and, if provided, by opening the first valve or keeping open the first valve when deactivating the hydrodynamic machine;
  emptying the collecting chamber via the filling channel by opening the second valve and, if present, by closing the first valve when activating the hydrodynamic machine or when the hydrodynamic machine is activated.

If the hydrodynamic machine is designed as a retarder, in braking operation, i.e. when the retarder is activated (rotating primary wheel and working chamber at least partially filled via the external working medium circuit), the first valve is closed while the second valve is opened so that working medium stored in the collecting chamber can flow via the second valve into the filling channel and from there into the working chamber. The collecting chamber is thereby emptied due to the negative pressure in the area of the filling channel. If the working medium pressure in the area of the mouth of the filling channel is so low that it falls below the vapour pressure of the working medium, the working medium vaporises in the collecting container. The closing of the first and opening of the second valve is thereby advantageously set during the braking with the retarder or a short time thereafter. If the braking process is now ended, the inflow of working medium from the working medium circuit into the working chamber is prevented so that the second valve is closed and the first valve opened. The working medium located in the working chamber is advantageously accelerated outwards as a result of the rotary movement of the primary wheel, impinges upon the tapping opening and flows through the opened first valve into the collecting container in which a relatively low pressure prevails due to the previously accomplished emptying. Any flow from the collecting container is prevented by the closed second valve. Parallel to this, for emptying the working chamber, as described hereinbefore, the working medium is removed from the working chamber via the outlet holes, the annular channel or the working medium outlet and therefore via the external working medium circuit. This removal takes place in regard to the working medium flow parallel to the removal via the at least one tapping opening. In other words, the working medium flows via the external working medium circuit for the purpose of emptying the working chamber and that via the tapping opening are independent of one another.

The collecting container is dimensioned so that an optimal amount of working medium remains inside the hydrodynamic retarder.

To this end, the collecting container can advantageously be designed so that its volume is smaller than the total volume of working medium in the hydrodynamic machine or in the hydrodynamic retarder when the working chamber is fully filled (circuit volume). In particular the collecting container volume can correspond to between 0.2 to 0.6 times the circuit volume.

As described, instead of the first valve, a diaphragm, in particular a solid diaphragm can be used whose opening cross-section is dimensioned so that a smaller volume flow of working medium is obtained through the diaphragm than through the opened second valve. In this case, the outflow of working medium from the collecting container is greater than the inflow, consequently the collecting container empties when the hydrodynamic machine is activated, when a comparatively large working medium flow is drawn via the second valve although not necessarily completely. As a result, the first valve and therefore its controller can be eliminated.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
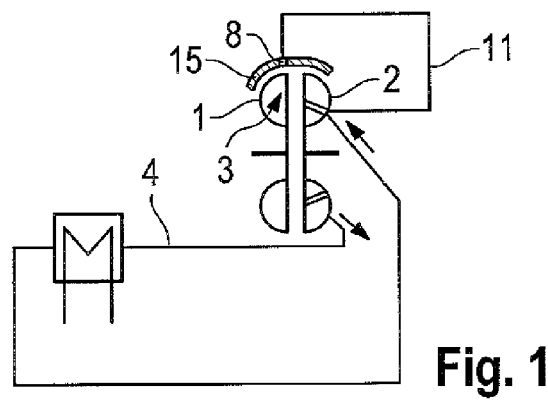
FIG. 1 shows a schematic diagram of a part of the hydrodynamic machine according to the invention.

FIG. 1 shows a diagram of the return line of a hydrodynamic machine according to the invention. The latter comprises a primary wheel 1 and a secondary wheel 2. Secondary wheel 2 and primary wheel 1, each provided with a blading (not shown here) and located opposite one another in the axial direction of the hydrodynamic machine, jointly form a toroidal working chamber 3 in which a circuit flow 24 (FIG. 2) can be formed in the filled or partially filled state so that torque is transmitted from the revolving primary wheel 1—in the embodiment as a hydrodynamic coupling—to the secondary wheel 2, whereby the secondary wheel 2 is set in motion. In the design as a hydrodynamic retarder the secondary wheel 2 is designed as a stator, therefore rotationally fixed, so that torque is transmitted from the revolving primary wheel 1 to the stationary secondary wheel 2 and a braking moment is thereby applied to the primary wheel 1.

The primary wheel 1 and the secondary wheel 2 are enclosed by a housing 15 here (shown in part) which has a tapping opening 8. The latter is connected via a return line 11 to the working chamber 3 in a flow-conducting manner. Preferably one, in particular a single tapping opening 8 and return line 11 is provided. However, a plurality of tapping openings 8 is also feasible, which in particular open into the same return line 11.

The return line 11 is provided in addition to the external working medium circuit 4 in which a heat exchanger is provided for removing heat from the working medium so that accordingly a circuit flow of working medium from the working chamber 3 through the return line 11 back into the working chamber 3 outside the external working medium circuit 4 can be established. It would also be possible to talk of a second, in particular smaller working medium circuit where the circulation in the second circuit with the return line 11 in particular can also take place when the circulation of the working medium from the working chamber 3 and back into the working chamber 3 via the external working medium circuit 4 is interrupted.

Figure 2:
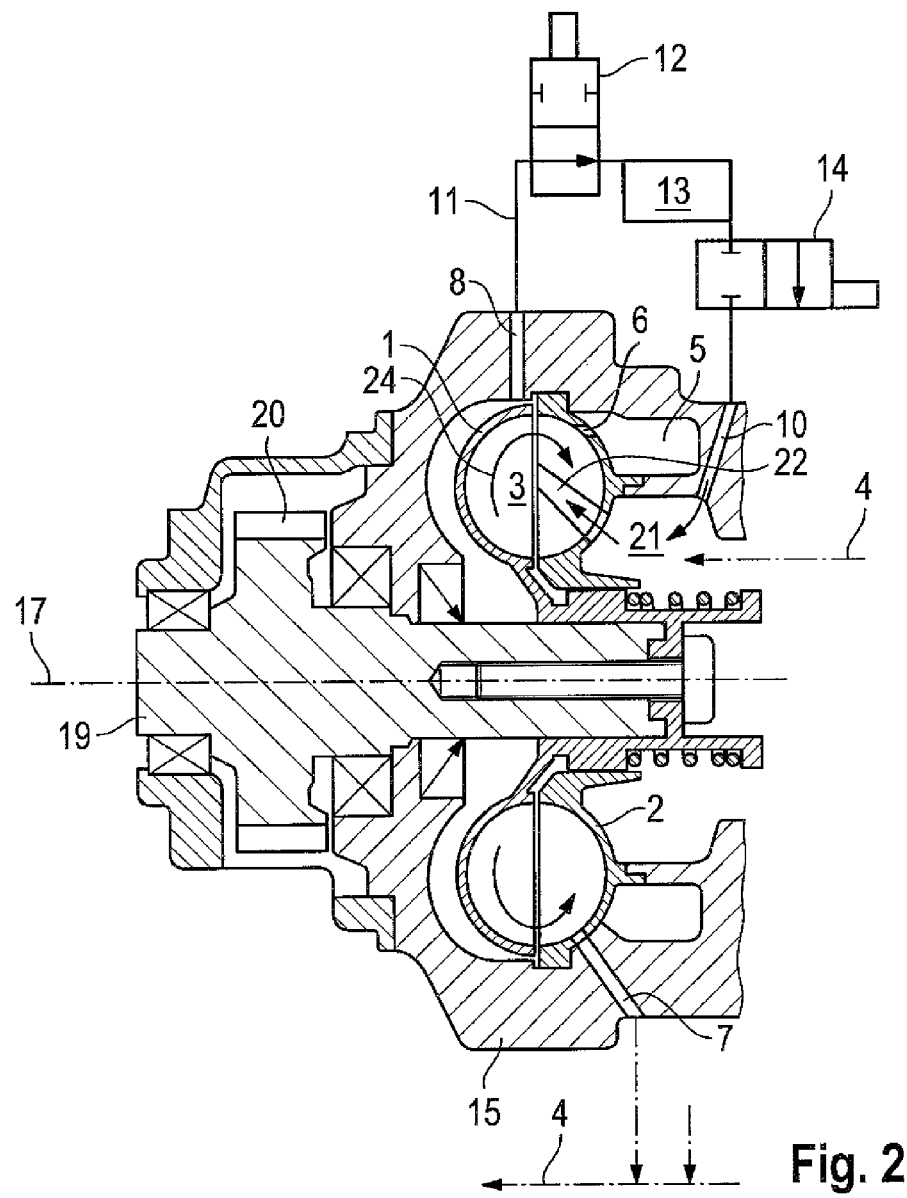
FIG. 2 shows an axial section through an advantageous embodiment of the invention in the form of a retarder.

FIG. 2 shows the hydrodynamic machine from FIG. 1 in detail, here designed as a retarder. In this case the same elements are provided with the same reference numbers. An input shaft 19 is provided which drives the primary wheel 1 and on which a pinion 20 is mounted or designed in one piece with the input shaft 19.

During operation of the hydrodynamic machine, i.e., in the present case in the braking operation of the retarder, a continuous exchange of working medium takes place between the working chamber 3 and an external working medium circuit 4. The external working medium circuit 4 is only shown schematically here and specifically that part which, when viewed in the flow direction, follows directly behind the hydrodynamic machine and that part which, when viewed in the flow direction, follows directly before the hydrodynamic machine. In the external working medium circuit 4 which, for example, can be part of a vehicle engine cooling circuit, a cooler (not shown) is usually provided for cooling the working medium heated in the working chamber 3. The working medium can accordingly be water or a water mixture or, in another embodiment, also oil.

During the operating state of the hydrodynamic machine and during the transition from the operating state (activated hydrodynamic machine) into the non-operating state (deactivated), the working medium passes from the working chamber 3 via a plurality of outlet holes in the secondary wheel 2 into an annular channel 5 extending in a toroidal shape over the circumference of the hydrodynamic machine and from there into the external working medium circuit 4. In this case a certain pressure loss occurs in the working medium flow, in particular at the outlet of the working medium from the outlet holes 6 into the annular channel, since an abrupt expansion of the flow cross section occurs here. This pressure loss has the result that in particular at comparatively low pressures in the working chamber 3, a complete emptying of the working chamber 3 in the non-operating state (non-braking operation) or transition from the operating state (braking operation) into the non-operating state (non-braking operation) is impeded.

The working medium remaining undesirably in the working chamber 3 has the result that in the non-operating state a residual torque is transmitted from the primary wheel 1 to the secondary wheel 2 which leads to an undesirable power loss in the drive train, for example motor vehicle drive train, in which the hydrodynamic machine is incorporated.

In order to enable a better emptying of the working chamber 3, an additional working medium outlet 7 is further provided in the flow direction parallel to the outlet holes 6 or the annular channel 5, via which working medium is passed from the working chamber 3 into the external circuit 4. Here the working medium outlet 7 is incorporated in the housing 15 which in the present case is designed as rotationally fixed with the secondary wheel. The additional working medium outlet 7 can be connected directly to the external working medium circuit 4 or open directly in this circuit.

In addition to the secondary wheel 2, the housing 15 also encloses the primary wheel 1 and therefore the working chamber 3 in which the circuit flow 24 can be formed. In the present case, in the region of the primary wheel 1, the tapping opening 8 is incorporated in the housing 15, as shown in FIG. 1. Here, this runs substantially in the radial direction of the hydrodynamic machine. However, this could also be different. At the same time, a plurality of tapping openings 8, in particular when viewed in the direction of rotation of the primary wheel 1, can be incorporated in the housing 15. The at least one tapping opening 8 is connected to the return line 11 and a filling channel 10 in a working medium conducting manner. In the present case, when viewed in the direction of flow of the working medium, a first valve 12, a collecting container 13 and a second valve 14 are disposed successively in the return line 11. In the present case, the filling channel 10 is also incorporated in the housing 15 or is formed by this and opens directly in a filling chamber 21 which has a lower working medium pressure than that prevailing in the tapping opening 8. The filling chamber 21 is connected in a working medium conducting manner to the working chamber 3 via a working medium inlet 22, for example in the form of a plurality of holes incorporated in the secondary wheel 2. As a result, working medium can be supplied from the external working medium circuit 4 and from the return line 11 at least indirectly to the working chamber 3.

In the operating state (braking operation) the first valve 12 is closed while the second valve 14 is opened so that no working medium flows via the return line 11 into the collecting container 13, but as a result of the comparatively lower working medium pressure in the filling chamber 21, working medium can flow from the collecting container 13 into the filling chamber 21. The collecting container 13 can empty in this case. At the same time however, a residual quantity of working medium can remain in the collecting container 13. On transition from the operating state into the non-operating state however, the first valve 12 is opened and the second valve 14 is closed. In so doing working medium accelerated outwards flows from the primary wheel 1 into the return channel 11 and through the opened valve 12 into the collecting container 13 since a comparatively low pressure prevails as a result of the previous emptying.

Figure 3:
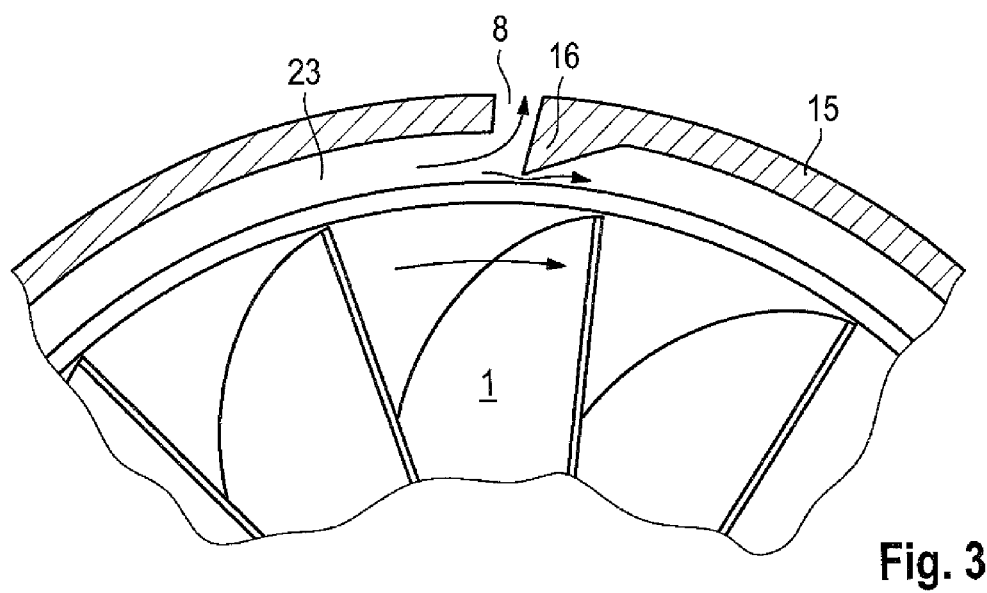
FIG. 3 shows a detailed view of the hydrodynamic machine in an axial section perpendicular to the axis of rotation of the hydrodynamic machine.
Figure 4:
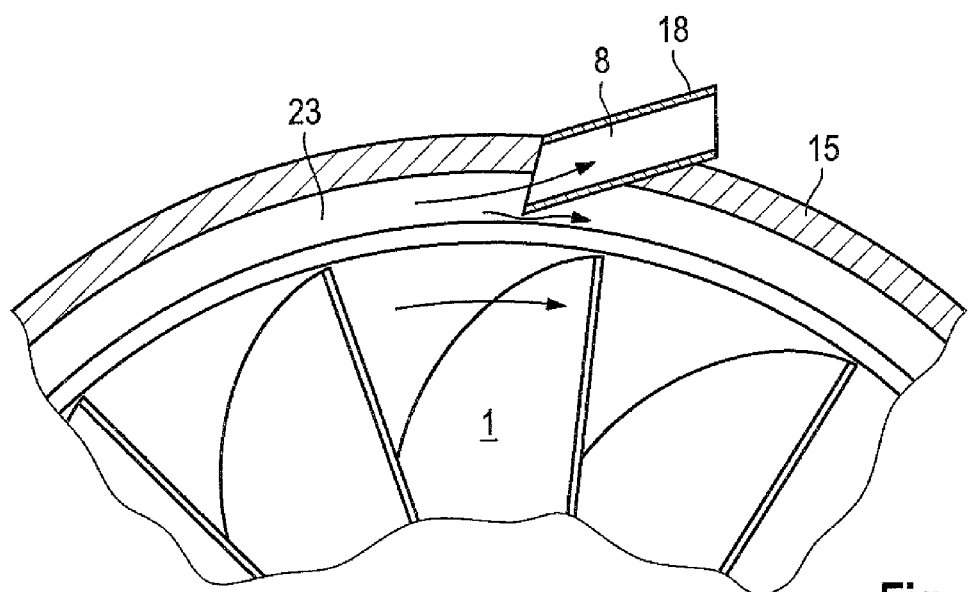
FIG. 4 shows a further embodiment of the hydrodynamic machine according to the invention shown in FIG. 3.

FIGS. 3 and 4 show two further embodiments of the tapping opening 8 of a hydrodynamic machine according to the invention, shown in an axial section perpendicular to the axis of rotation 17 (FIG. 2) of the hydrodynamic machine. Here also the same elements are designated with the same reference numbers.

FIG. 3 shows in the present case the primary wheel 1 and a part of the housing 15. Both define a gap 23 through which working medium can flow from the working chamber 3 into the pressure tapping opening 8 shown. When viewed in the direction of flow or direction of rotation of the primary wheel 1, the housing 15 is designed behind the tapping opening 8 in such a manner that it forms a projection 16 on its surface facing the primary wheel 1. In this case the projection 16 runs radially in the direction of the primary wheel 1. As a result a minimal gap is formed in the radially innermost region of the projection 16 which lets through little working medium and consequently most of the working medium is deflected into the tapping opening 8 on the front side facing the tapping opening 8.

Instead of the projection 16, FIG. 4 shows a further embodiment of the tapping opening 8. The latter is designed in the present case as an oblique hole. This means that the extension of the longitudinal axis of the hole when viewed in an axial section perpendicular to the axis of rotation of the hydrodynamic machine, intersects the housing 15 in the manner of secant. In this case a sleeve 18 is inserted in the tapping hole 8. As a result of this oblique hole, working medium can be optimally removed from the gap 23 into the return line 11. The sleeve 18 can be manufactured as a roll pin, in particular made of steel.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE LIST

1 Primary wheel
2 Secondary wheel
3 Working chamber
4 Working medium circuit
5 Annular channel
6 Outlet holes
7 Working medium outlet
8 Tapping opening
9 Auxiliary chamber
10 Filling channel
11 Return line
12 First valve
13 Collecting container
14 Second valve
15 Housing
16 Projection
17 Axis of rotation
18 Sleeve
19 Input shaft
20 Pinion
21 Filling chamber
22 Working medium inlet
23 Gap
24 Circuit flow

What is claimed is:

1. A hydrodynamic machine having an external working medium circuit and being a retarder, said hydrodynamic machine comprising:
    a bladed primary wheel;
    a bladed secondary wheel, said primary and secondary wheels together forming a toroidal working chamber which is configured for being filled with a working medium from the external working medium circuit, the hydrodynamic machine being configured such that said working medium is fed back into the external working medium circuit;
    an annular channel disposed outside said working chamber, said annular channel being connected in a working-medium conducting manner to said working chamber via a plurality of outlet holes in one of said primary wheel and said secondary wheel, said annular channel being in a flow-conducting communication with the external working medium circuit in order to collect said working medium leaving said working chamber through said plurality of outlet holes and supply said working medium leaving said working chamber through said plurality of outlet holes to the external working medium circuit;
    at least one tapping opening disposed one of on and outside said working chamber, said at least one tapping opening being in a flow-conducting communication with said working chamber of the hydrodynamic machine;
    at least one filling channel which opens into a region of relatively low working medium pressure inside the hydrodynamic machine and which is in a flow-conducting communication with said working chamber; and
    a return line, wherein said at least one tapping opening and said at least one filling channel are interconnected in a working-medium conducting manner by way of said return line outside the external working medium circuit in such a manner that said working medium flows from said at least one tapping opening into said at least one filling channel and from said at least one filling channel back into said working chamber so that a working medium circuit is established outside the external working medium circuit.

2. The hydrodynamic machine according to claim 1, further including a collecting container, a second valve, and one of a first valve and a diaphragm, wherein, when viewed in a direction of flow of said working medium, (a) one of said first valve and said diaphragm, (b) said collecting container, and (c) said second valve are disposed successively in said return line.

3. The hydrodynamic machine according to claim 2, wherein said first valve and said second valve are directional valves.

4. The hydrodynamic machine according to claim 2, wherein a volume of said collecting container is smaller than a circuit volume of the hydrodynamic machine.

5. The hydrodynamic machine according to claim 1, further including a housing which encloses said primary wheel and said secondary wheel, said at least one tapping opening being incorporated in said housing.

6. The hydrodynamic machine according to claim 5, wherein said housing includes a side facing one of said primary wheel and said secondary wheel, said side having a projection in a radial direction behind said at least one tapping opening when viewed in a flow direction of said working medium.

7. The hydrodynamic machine according to claim 5, wherein said at least one tapping opening is a hole.

8. The hydrodynamic machine according to claim 7, wherein an extension of a longitudinal axis of said at least one tapping opening runs through said housing in an axial section perpendicular to an axis of rotation of the hydrodynamic machine in a manner of a secant.

9. The hydrodynamic machine according to claim 7, further including a sleeve, said sleeve being inserted in said at least one tapping opening.

10. A method for minimizing a drag power of a hydrodynamic machine, said method comprising the steps of:

providing that the hydrodynamic machine has an external working medium circuit and is a retarder, the hydrodynamic machine including:

a bladed primary wheel;

a bladed secondary wheel, said primary and secondary wheels together forming a toroidal working chamber which is configured for being filled with a working medium from the external working medium circuit, the hydrodynamic machine being configured such that said working medium is fed back into the external working medium circuit;

an annular channel disposed outside said working chamber, said annular channel being connected in a working-medium conducting manner to said working chamber via a plurality of outlet holes in one of said primary wheel and said secondary wheel, said annular channel being in a flow-conducting communication with the external working medium circuit in order to collect said working medium leaving said working chamber through said plurality of outlet holes and supply said working medium leaving said working chamber through said plurality of outlet holes to the external working medium circuit;

at least one tapping opening disposed one of on and outside said working chamber, said at least one tapping opening being in a flow-conducting communication with said working chamber of the hydrodynamic machine;

at least one filling channel which opens into a region of relatively low working medium pressure inside the hydrodynamic machine and which is in a flow-conducting communication with said working chamber;

a return line, wherein said at least one tapping opening and said at least one filling channel are interconnected in a working-medium conducting manner by way of said return line outside the external working medium circuit in such a manner that said working medium flows from said at least one tapping opening into said at least one filling channel and from said at least one filling channel back into said working chamber so that a working medium circuit is established outside the external working medium circuit;

a collecting container;

a second valve; and one of a first valve and a diaphragm, when viewed in a direction of flow of said working medium (a) one of said first valve and said diaphragm, (b) said collecting container, and (c) said second valve being disposed successively in said return line;

filling said collecting container with said working medium from said working chamber via an additional working medium outlet by one of closing said second valve and keeping closed said second valve and, if provided, by one of opening said first valve and keeping open said first valve when deactivating the hydrodynamic machine; and emptying said collecting chamber via said at least one filling channel by opening said second valve and, if present, by closing said first valve one of when activating the hydrodynamic machine and when the hydrodynamic machine is activated.

* * * * *